Feb. 13, 1962  E. J. H. FIALA  3,021,152
INDEPENDENT WHEEL SUSPENSION
Filed March 11, 1958
Fig. 1.
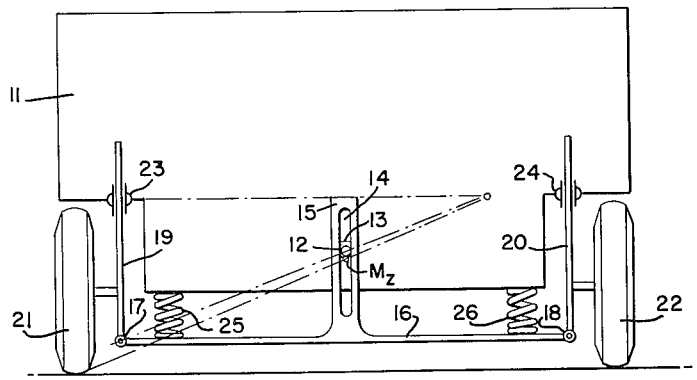
Fig. 2.
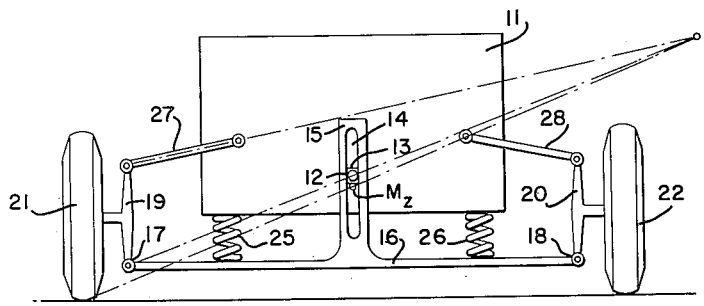
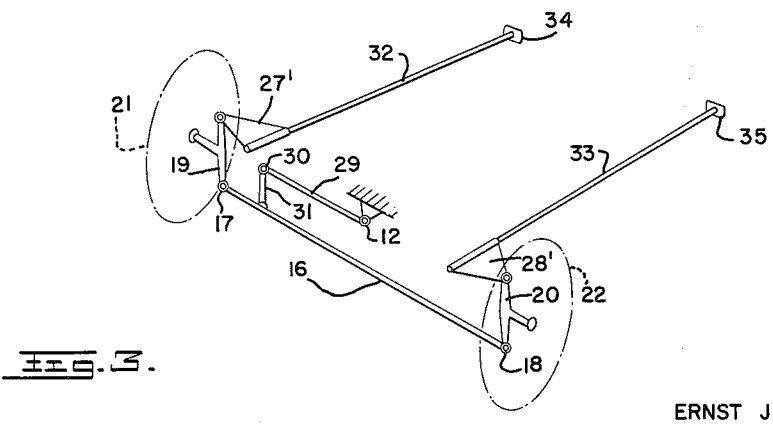
Fig. 3.
INVENTOR.
ERNST J. H. FIALA
BY Dicke and Craig
ATTORNEYS

United States Patent Office 3,021,152
Patented Feb. 13, 1962

3,021,152
INDEPENDENT WHEEL SUSPENSION
Ernst J. H. Fiala, Sindelfingen, Kreis Boeblingen, Germany, assignor to Daimler-Benz Aktiengesellschaft, Stuttgart-Unterturkheim, Germany
Filed Mar. 11, 1958, Ser. No. 720,726
12 Claims. (Cl. 280—124)

The present invention relates to an independent wheel suspension for the wheels of a vehicle, and more particularly to an independent wheel suspension for the wheels of a motor vehicle in which two wheels are connected with each other in such a manner as to minimize any changes in camber and tread during unidirectional movements of the wheels.

In particular, in connection with front wheel axles of motor vehicles, wheel suspensions are desirable in which the moment center for the rotation of the vehicle body with respect to the wheels or chassis is disposed relatively high about a vehicle longitudinal axis.

Wheel suspensions are known in the prior art in which this requirement of a relatively high moment center is fulfilled. However, in such prior art wheel suspensions, the camber and the wheel tread change a relatively large amount during unidirectional spring movements of both wheels of the same axis or axle, i.e., upon unidirectional spring movements of opposite wheels.

The wheel suspension in accordance with the present invention avoids these disadvantages of the prior art, and essentially consists in that with vehicles, particularly motor vehicles, in which the wheel carriers for the front wheels and/or rear wheels, i.e., the axle spindles, the steering knuckles, the king pins and the like, are guided in two joints each, the lower joint thereof being rigidly connected with the corresponding joint of the opposite front or rear wheel thereof whereby the rigid connecting member is so pivotally connected about an axis rigid at the vehicle superstructure and extending in the longitudinal direction of the vehicle and disposed in the central vertical longitudinal plane of the vehicle that it is able to pivot about this axis and is also adapted to move parallel to itself.

With such types of wheel suspensions, depending on the particular constructive embodiment, no or practically no changes in the tread or camber take place during unidirectional spring movements of the two wheels, i.e., when passing over a bump or other obstruction in the road which extends over the entire width thereof or at least over the wheel tread of the vehicle. On the other hand, such wheel suspensions offer a relatively high moment center.

Many different possibilities exist in such wheel suspensions for the guidance of the upper joint of each wheel carrier. For example, corresponding to a type of construction which is considered very widely used, the upper joint of the two joints of each wheel carrier may be arranged at the end of a transverse guide member which is pivotally connected to the vehicle superstructure such as frame or vehicle body.

The upper guide arrangement may, however, also be so made that the upper joint is constructed as a pivotal sliding joint secured at the vehicle superstructure, such as frame or body.

The present invention proposes for the bearing or support of the rigid connecting member between the two lower joints of the two interconnected wheel carriers that this rigid connecting member, for instance, is supported at the axis formed by a pin or shaft rigidly connected with the vehicle superstructure by means of a vertical sliding guide means vertically disposed in the center position thereof, for example, by means of a sliding-member guiding arrangement.

It is also possible in accordance with the present invention to circumvent the disadvantages with respect to manufacture, upkeep, and wear and tear which such sliding guide arrangements entail, for example, in that the rigid connecting member is pivotally connected to a transverse guide member above the straight line connecting the two lower wheel carrier joints which transverse guide member extends at least approximately horizontally in the center position thereof and which is pivotally supported at the vehicle in the aforementioned axis rigid at the vehicle.

Accordingly, it is an object of the present invention to provide an independent wheel suspension which offers a relatively high moment center without the disadvantage of a change in either the camber or tread during unidirectional spring movements of the wheels.

Another object of the present invention is the provision of an independent wheel suspension for either the front and/or rear wheels of the vehicle which is simple, effective in operation, may be readily serviced, and which obviates the disadvantages of the prior art devices.

These and other objects, features and advantages of the present invention will become more obvious from the following description when taken in connection with the accompanying drawing which shows, for purposes of illustration only, several embodiments in accordance with the present invention and wherein:

FIGURE 1 is a somewhat schematic end view of a wheel suspension in accordance with the present invention provided with a sliding guide arrangement for the rigid connecting member and pivotal sliding joints for the guidance of the wheel carriers;

FIGURE 2 is a somewhat schematic end view of a second embodiment of a wheel suspension in accordance with the present invention in which the pivotal sliding guide joints are replaced by conventional transverse guide arms or members; and, FIGURE 3 is a schematic perspective view of a third embodiment of a wheel suspension in accordance with the present invention in which the rigid connecting member is solely suspended in joints.

Referring now to the drawing wherein like reference numerals are used throughout the various views to designate like parts, and more particularly to FIGURE 1, reference numeral 12 designates therein an axle, shaft or pin rigidly arranged in the vertical central longitudinal plane of the vehicle at the vehicle superstructure, such as the body schematically shown in FIGURE 1 and designated therein by reference numeral 11. The axis of shaft or pin 12 extends essentially in the longitudinal direction of the vehicle. The pin or shaft 12 is surrounded by a sliding member 13, for instance, of square or rectangular shape which is adapted to slide in an elongated slot 14. The part 15, in which the elongated slot or aperture 14 is provided, is rigidly connected with the rigid connecting member 16 which in turn is connected with the wheel carriers 19 and 20, formed, for example, by axle spindles, steering knuckles, king pins and the like for the wheels 21 and 22 of any suitable construction. Pivotal joint means 17 and 18 which have their swivel axis located substantially in the longitudinal direction of the vehicle connect the rigid connecting member 16 to the wheel carriers 19 and 20. The second guide joint 23 and 24 for each wheel carrier 19 and 20, respectively, is constructed as pivotal sliding joint. The spring system is formed by springs 25 and 26 which are arranged between the rigid connecting member 16 and the vehicle superstructure 11.

Operation

During unidirectional spring movements of the two wheels 21 and 22, i.e., for example, when the vehicle passes over a bump or unevenness in the ground or an obstruction extending over the width of the road, the two wheels 21 and 22, and therewith the wheel carriers 19 and 20 thereof as well as the connecting member 16 together with the part 15 move vertically upwardly against the return force of springs 25 and 26. As can be seen without any difficulty from FIGURE 1, no changes in the track or tread and camber occur thereby.

With the occurrence of oppositely directed or unilateral wheel movements, for example, as they occur if one of the wheels 21 and 22 only drives over an obstacle in the road, a relative rotation of the rigid connecting member 16 takes place with respect to the vehicle body. The dot-and-dash lines in the drawing indicate how the moment center MZ may be found for these rotational movements. This moment center MZ is disposed relatively high which, particularly with front wheel suspensions, is very desirable in most cases, for example, for reducing the moment caused by the centrifugal force when traversing curves which seeks to tip the vehicle body toward the outside of the curve.

Thus, the construction in accordance with the present invention combines the advantages of a relatively high location of the moment center MZ above the road bed with the advantages that with unidirectional spring movements of the wheels, no changes in the tread or camber occur.

The embodiment according to FIGURE 2 distinguishes itself from that of FIGURE 1 solely in the substitution of transverse guide members 27 and 28 in the place of the pivotal sliding joints 23 and 24. The transverse guide members or arms 27 or 28 may be of any suitable construction, for example, of pressed sheet-metal parts or the like pivotally secured to the wheel carriers 19 and 20, on the one hand, and to the superstructure 11, on the other. Under certain circumstances, such transverse guide members 27 and 28 may be constructively more favorable than pivotal sliding joints. On the other hand, slight changes in tread and camber cannot be completely avoided in a construction according to the embodiment of FIGURE 2 with unidirectional spring movements of both wheels 21 and 22.

In the embodiment according to FIGURE 3, the guide arrangement with the sliding member for the rigid connecting member 16 of FIGURES 1 and 2 is replaced by a guide arrangement formed exclusively by means of rotary joints.

More particularly, a transverse guide member 29 which extends approximately horizontally in the center position thereof is pivotally supported at the shaft or pin 12 rigid with the vehicle body 11, which traverse guide member 29 is also pivotally connected with the rigid connecting member 16 or with the extension 31 thereof rigidly secured thereto. Transverse guide members 27' and 28' are also provided in this construction for the upper guidance of the wheel carriers 19 and 20. The guide members 27' and 28' are thereby directly connected with the torsion rod springs 32 and 33. The torsion rod springs 32 and 33 are secured rigidly at the vehicle body or frame thereof at 34 and 35 which indicate schematically such connection.

It is understood that the guide arrangements of either FIGURE 1 or FIGURE 2 may also be used for the guidance of the upper end of each wheel carrier.

The operation of the embodiment according to FIGURE 3 distinguishes itself only insignificantly from that of FIGURES 1 and 2.

The term "superstructure" is used herein to designate the frame or body, such as self-supporting body of the vehicle.

Moreover, the present invention is applicable to front or rear wheels, and the interconnecting member may interconnect oppositely disposed wheels, such as front or rear wheels.

While I have shown and described three embodiments in accordance with the present invention, it is understood that the same is not limited thereto but is susceptible of many changes and modifications within the spirit and scope of the present invention, and I, therefore, intend to cover all such changes and modifications as encompassed by the appended claims.

I claim:

1. A wheel suspension for vehicles having a superstructure and a plurality of wheel carrier means for supporting thereon the vehicle wheels, guiding means for independently and pivotally connecting the upper end of each wheel carrier means to said superstructure, rigid connecting means including a rigid member pivotally interconnecting the lower ends of two said wheel carriers disposed on opposite sides of the vehicle for correlating movement of the two wheel carriers with respect to each other and for pivotally connecting each lower end of said wheel carrier to said superstructure, and joint means for pivotally supporting said rigid interconnecting member to said vehicle superstructure, said joint means being so constructed and arranged as to allow up and down movement of said rigid interconnecting member parallel with respect to itself as well as pivotal movement thereof.

2. A wheel suspension for vehicles according to claim 1, wherein said joint means is located in the vertical central longitudinal plane of the vehicle and enables pivotal movement about an essentially longitudinal axis.

3. A wheel suspension for vehicles according to claim 1, wherein said first-mentioned guiding means are constructed as pivotal sliding joints.

4. A wheel suspension for vehicles according to claim 1, wherein said first-mentioned guiding means includes transverse guide arms pivotally secured with said upper ends and said superstructure.

5. A wheel suspension for vehicles according to claim 1, wherein said joint means includes sliding guide means between said superstructure and said rigid interconnecting member.

6. A wheel suspension for vehicles according to claim 5, wherein said sliding guide means includes a pivotal sliding member and wherein said rigid interconnecting member is provided with a part containing an aperture, said pivotal sliding member being adapted to slide within said aperture.

7. A wheel suspension for vehicles having a superstructure and a plurality of wheel carrier means for supporting thereon the vehicle wheels, guiding means for pivotally connecting the upper end of each wheel carrier means to said superstructure, rigid connecting means including a rigid interconnecting member pivotally interconnecting the lower ends of two of said wheel carriers disposed on opposite sides of the vehicle for correlated movement of the two wheel carriers and for pivotally connecting each lower end of said wheel carriers to said superstructure, pivot means interconnecting the lower ends of each of said wheel carriers to said rigid interconnecting member, and joint means for pivotally supporting said rigid interconnecting member at said vehicle superstructure, said joint means being so constructed and arranged as to allow up and down movement of said rigid interconnecting member parallel to itself as well as pivotal movement thereof with respect to said superstructure.

8. A wheel suspension for vehicles having a superstructure and a plurality of wheel carrier means for supporting thereon the vehicle wheels, guiding means for independently and pivotally connecting the upper end of each wheel carrier means to said superstructure, rigid connecting means pivotally interconnecting the lower ends of two of said wheel carriers disposed on opposite sides of the vehicle for correlated movement of the two wheel carriers with respect to each other and for pivotally connecting each lower end of said wheel carrier to said superstructure, pivot means pivoting about an axis located substantially in the longitudinal direction of the vehicle interconnecting the lower ends of said two wheel carriers with the rigid connecting means, and joint means for pivotally supporting said rigid interconnecting means to said vehicle superstucture.

9. A wheel suspension for vehicles having a superstructure and a plurality of wheel carrier means for supporting thereon the vehicle wheels, guiding means for pivotally connecting the upper end of each wheel carrier means to said superstructure, rigid connecting means pivotally interconnecting the lower ends of two said wheel carriers disposed on opposite sides of the vehicle for correlated movement of the two wheel carriers with respect to each other and for pivotally connecting each lower end of said wheel carriers to said superstructure, and joint means for pivotally supporting said rigid interconnecting means to said superstructure, said joint means including transverse guide means pivotally secured at said superstructure and to said rigid interconnecting means.

10. A wheel suspension for vehicles according to claim 9, wherein said guide means is pivotally connected in a plane above the straight line connecting the joints of each lower end of each wheel carrier.

11. A wheel suspension for vehicles according to claim 10, wherein said guide means extends approximately horizontally in the center position thereof.

12. A wheel suspension for vehicles having a superstructure and a plurality of wheel carrier means for supporting thereon the vehicle wheels, guiding means including transverse guide arms and torsion rod springs for pivotally connecting the upper end of each wheel carrier means to said superstructure, each of said guide arms being pivotally secured with one of said upper ends of the wheel carrier means and directly connected with a torsion rod spring, rigid connecting means pivotally interconnecting the lower ends of two said wheel carriers disposed on opposite sides of the vehicle for correlated movement of the two wheel carriers with respect to each other and for pivotally connecting each lower end of said wheel carrier to said superstructure, and joint means for pivotally supporting said rigid interconnecting means to said vehicle superstructure.

References Cited in the file of this patent

UNITED STATES PATENTS

| | | |
|---|---|---|
| 1,826,113 | Winsor | Oct. 6, 1931 |
| 1,890,766 | Adams | Dec. 13, 1932 |
| 2,074,289 | Wagner | Mar. 16, 1937 |
| 2,279,120 | Hurley | Apr. 7, 1942 |